United States Patent
Bier et al.

(10) Patent No.: US 6,548,146 B1
(45) Date of Patent: Apr. 15, 2003

(54) COMPOSITE CONSISTING OF A COATED POLYCARBONATE AND A POLYMER

(75) Inventors: Peter Bier, Krefeld (DE); Peter Capellen, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/700,327

(22) PCT Filed: May 3, 1999

(86) PCT No.: PCT/EP99/02968

§ 371 (c)(1),
(2), (4) Date: Nov. 9, 2000

(87) PCT Pub. No.: WO99/59793

PCT Pub. Date: Nov. 25, 1999

(30) Foreign Application Priority Data

May 14, 1998 (DE) .......................... 198 21 629

(51) Int. Cl.$^7$ .............................. B32B 3/00; B29C 61/00
(52) U.S. Cl. ..................... 428/174; 428/213; 428/215; 428/412; 428/177; 428/192; 428/14; 264/265; 264/275
(58) Field of Search ..................... 428/213, 215, 428/412, 425.6, 426, 177, 192, 14; 40/152, 780, 734, 760; 264/265, 275, 250, 259

(56) References Cited

U.S. PATENT DOCUMENTS

| | | | | |
|---|---|---|---|---|
| 3,415,709 A | * | 12/1968 | Santangelo | 161/44 |
| 4,196,545 A | * | 4/1980 | Korany et al. | 49/463 |
| 4,284,685 A | * | 8/1981 | Olson et al. | 428/331 |
| 4,424,637 A | * | 1/1984 | Leahy | 40/152 |
| 4,695,420 A | | 9/1987 | Grawey et al. | 264/265 |
| 4,799,346 A | * | 1/1989 | Bolton et al. | 52/509 |
| 5,002,820 A | * | 3/1991 | Bolton et al. | 428/215 |
| 5,131,778 A | | 7/1992 | Asai et al. | 403/24 |
| 5,376,410 A | | 12/1994 | MacKelvie | 427/290 |
| 5,561,951 A | * | 10/1996 | Hall | 52/171.1 |
| 5,902,198 A | * | 5/1999 | Martin et al. | 473/481 |
| 6,174,482 B1 | * | 1/2001 | Reames et al. | 264/250 |
| 6,265,054 B1 | * | 7/2001 | Bravet et al. | 428/213 |
| 6,294,233 B1 | * | 9/2001 | Barth et al. | 428/34 |

FOREIGN PATENT DOCUMENTS

| | | |
|---|---|---|
| DE | 1342927 | 10/1963 |
| DE | 1904625 | 11/1964 |
| DE | 1755596 | 11/1971 |
| DE | 3 044 851 | 7/1982 |
| DE | 3523779 | 1/1987 |
| DE | 2459669 | 7/1995 |
| EP | 0 812 669 | 12/1997 |

OTHER PUBLICATIONS

Patent Abstracts of Japan, vol. 007, No. 037 (M–193), Feb. 15, 1983 & JP 57 189834 A (Canon KK), Nov. 22, 1982.

* cited by examiner

*Primary Examiner*—Harold Pyon
*Assistant Examiner*—Catherine A. Simone
(74) *Attorney, Agent, or Firm*—Joseph C. Gil; Aron Preis; James R. Franks

(57) ABSTRACT

A composite plastic structure is described. The composite structure includes: (a) a shaped polycarbonate article having an edge region, the edge region having an adhesion-promoting geometric feature therein; (b) a coating applied to the surface of the shaped polycarbonate article; and (c) a polymer that is injection-molded or cast over the edge region of the shaped polycarbonate article. The polymer (c) envelopes the adhesion-promoting geometric feature of the shaped polycarbonate article (a). The envelopment of the adhesion-promoting geometric feature by the polymer (c) provides a structurally firm connection between the shaped polycarbonate article (a) and the polymer (c). Also described is a method of preparing the composite structure, and composite structures according to the present invention, such as picture frames, slide frames, windows having a seal or frame, and a glazing for a motor vehicle.

13 Claims, 1 Drawing Sheet

COMPOSITE CONSISTING OF A COATED POLYCARBONATE AND A POLYMER

FIELD OF THE INVENTION

The present invention relates to a composite structure comprising a shaped polycarbonate article, the surface of which is coated and which has an adhesion-promoting geometric feature in the edge region, and a polymer; the production of the composite structure; the use thereof for the production of products; and products produced therefrom.

BACKGROUND OF THE INVENTION

The replacement of glass by polycarbonate has progressed ever further, especially in areas where glass is a disadvantage because of its weight and/or because of its susceptibility to fracture.

Polycarbonate, which can be employed as a glass substitute, must be coated so that it is both scratch-resistant and resistant to other environmental influences. However, such coating of the polycarbonate as a rule has the result that the polycarbonate will not undergo chemical or physical bonding to other polymers, so that a composite structure, wherein another polymer is firmly adhered to the coated polycarbonate, is generally not possible without the aid of connecting means, such as e.g. screws.

SUMMARY OF THE INVENTION

The object of the present invention is therefore to provide a composite structure comprising a shaped polycarbonate article, the surface of which is coated, and a polymer, wherein the composite has a firm structure without the need for connecting means, such as e.g. screws; a process for the production of the composite according to the invention; and products which are produced therefrom.

The object according to the invention is achieved by a composite structure comprising a shaped polycarbonate article, the surface of which is coated and which has an adhesion-promoting geometric feature in the edge region, and a polymer, which is obtainable by injection-moulding or casting the polymer around the shaped article in the edge region; a process for the production of the composite according to the invention by injection-moulding or casting material around the shaped article of polycarbonate in the edge region; the use thereof for the production of products; and the products thus obtainable.

DETAILED DESCRIPTION OF THE INVENTION

Figure 1:
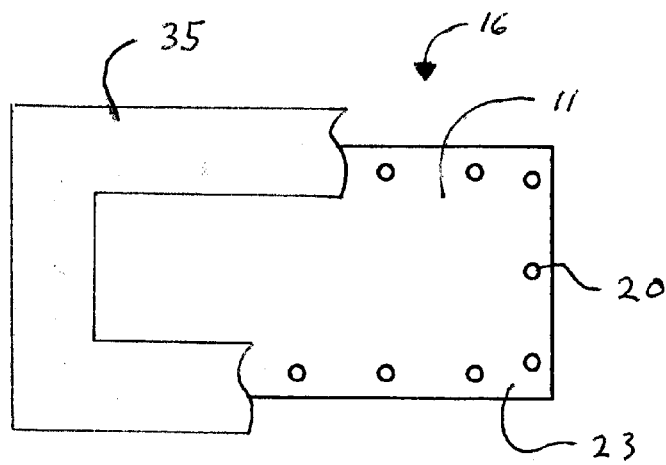
FIG. 1 is a representative depiction of a composite structure 16 according to the present invention which includes a polycarbonate film 11 with bores 20 in the edge region 23, and a partially cut-away polymer element 35.

The composite according to the invention has the advantage that there is structural cooperation between the coated, shaped polycarbonate article and the polymer, although the shaped article and the polymer undergo neither chemical nor physical bonding. Physical bonding means e.g. a particularly firm adhesion.

Polycarbonates in the context of the present invention are both homopolycarbonates and copolycarbonates. The polycarbonates can be linear or branched. The homopolycarbonate based on bisphenol A (2,2-bis-(4-hydroxyphenyl)-propane) or the copolycarbonate based on bisphenol A and up to 60 mole %, based on the molar sum of bisphenols, 1,1-bis-(4-hydroxyphenyl)-3,3,5-trimethylcyclohexane is preferably employed. The homopolycarbonate based on bisphenol A is particularly preferably employed.

Polycarbonates in the context of the present invention are also those aromatic polycarbonates in which up to 80 mole %, preferably from 20 mole % up to 50 mole %, of the carbonates groups are replaced by aromatic dicarboxylic acid ester groups. Such polycarbonates, which contain both acid radicals of carbonic acid and acid radicals of aromatic dicarboxylic acids incorporated into the molecular chain, are called aromatic polyester-carbonates. They are to be summarized under the generic term of polycarbonates.

Polycarbonates can be prepared by known processes. Reference by way of example is made here only to Schnell, Chemistry of Physics of Polycarbonates, Polymer Reviews, volume 9, Interscience Publishers, New York, London, Sydney 1964, and to D. C. Prevorsek, B. T. Debona and Y. Kesten, Corporate Research Center, Allied Chemical Corporation, Morristown, N.J. 07960, "Synthesis of Poly (ester-carbonate)copolymers" in Journal of Polymer Science, Polymer Chemistry Edition, vol. 19, 75–90 (1980), and to D. Freitag, U. Grigo, P. R. Müller, N. Nouvertne, BAYER A G, "Polycarbonates" in Encyclopaedia of Polymer Science and Engineering, volume 11, 1988, second edition, 1988 pages 648–718 and finally to U. Grigo, K. Kircher and P. R. Müller, "Polycarbonate" in Becker, Braun, Kunststoff-Handbuch, volume 3/1, Polycarbonate, Polyacetale, Polyester, Celluloeester, Carl Hanser Verlag Munich, Vienna, 1992, pages 117–299.

The polycarbonates according to the invention have average molecular weights $\overline{M}_w$ of 12,000 to 400,000 g/mole (determined by measuring the relative viscosity of a solution of methylene chloride having a concentration of 0.5 g polycarbonate per 100 ml methylene chloride at 25° C.), preferably of 18,000 to 80,000 g/mole, and in particular 22,000 to 60,000 g/mole.

The polycarbonates according to the invention may comprise additives.

Coated in the context of the invention means that the shaped polycarbonate article is provided with a scratch-resistant surface coating which is also resistant to chemicals and optionally absorbs UV, and can additionally have hydrophilic or hydrophobic properties. Preferably, more than 50% of the edge region of the shaped article according to the invention of polycarbonate is coated. Particularly preferably, more than 75% of the edge region is coated.

All coatings known to the expert which render the polycarbonate scratch-resistant such that it has a glass-like surface structure can be employed as the surface coating. A surface coating such as is described in WO 95/13 426 is preferably employed.

The composite according to the present invention is achieved by injection-moulding or casting a polymer around the shaped article in the edge region. Polymers in the context of the invention include all thermoplastics, and also rubber-like polymers (rubbers), such as are employed e.g. as a sealing composition, or also thermosetting polymers. Blends of the polymers mentioned can also be employed.

The composite according to the invention is preferably produced by injection-moulding thermoplastics around the shaped article.

Examples of thermoplastics which may be mentioned are polystyrene, polyurethane, polyamide, polyester, polyacetal, polyacrylate, polycarbonate, polyethylene, polypropylene, polyvinyl chloride, polystyrene/acrylonitrile and copolymers based on the polymers mentioned and blends of the polymers or copolymers mentioned with another or with further polymers.

Rubber-like polymers in the context of the invention are e.g. polyisoprene, polychloroprene, styrerne/butadiene rubber, rubber-like ABS polymers and copolymers of ethylene and one or more of the following compounds: vinyl acetate, acrylic acid esters, methacrylic acid esters or propylene.

Casting resins, such as e.g. unsaturated polyesters, epoxy resin compositions, acrylates, formaldehyde resins or polyurethanes, can furthermore also be used as polymers in the context of the invention.

Thermoplastics, rubbers and thermosetting resins which can be employed according to the invention are listed e.g. in Saechtling, Kunststoff-Taschenbuch, edition 26, Carl Hanser Verlag, Munich, Vienna, 1995 and in Vieweg and Braun, Kunststoff-Handbuch, Carl Hanser Verlag Munich, Vienna, 1995, and in Becker, Braun, Kunststoff-Handbuch, Carl Hanser Verlag Munich, Vienna, 1992.

The polymers according to the invention may comprise additives.

The composite according to the invention is preferably produced by injection-moulding thermoplastics around the shaped article.

The shaped polycarbonate article is preferably a sheet or a film. The sheet can be either flat or curved. Curved in the context of the invention means that the sheet is curved such that it has a particular shape, for example as is required in automobile construction in the form of the front windscreen or rear screen, or as skylights in house construction. The sheet preferably has a thickness of 1 mm to 3 cm, particularly preferably 3 mm to 10 mm. The film preferably has a thickness of less than 1 mm, particularly preferably 0.25 to 1.0 mm.

In another preferred embodiment of the invention, the shaped article has a curved surface, such as occurs in particular in optical lenses.

The shaped article preferably has, as an adhesion-promoting geometric feature in the edge region, one or more recesses or circular or oval bores or indentations or scallops or stamp-outs or half-stamps or corrugations, which are enveloped by the polymer when the polymer is injection-moulded or cast around the shaped article, so that a structurally firm connection results between the shaped article and the polymer.

A preferred embodiment of the invention is a composite structure of polycarbonate based on bisphenol A, the surface of which is coated, and a thermoplastic; the production and use thereof; and products produced therefrom.

The edge region preferably comprises less than 20% of the total surface area of the shaped article according to the invention of polycarbonate. It particularly preferably comprises less than 10%. Edge region is to be understood as e.g. the surface close to the edge of a sheet. In the case of shaped articles which have no clear edge, such as e.g. a sphere, the edge region is an arbitrarily chosen part of the surface of the shaped article.

The composite according to the invention is suitable for the production of various products. The composite according to the invention is particularly suitable for the production of framed objects, such as e.g. slide frames.

The composite according to the invention is furthermore particularly suitable for the production of polycarbonate window panes, either the seal or even the entire frame being attached to the coated polycarbonate pane by an injection moulding operation.

The composite according to the invention is furthermore particularly suitable for the production of car headlamps. In this case e.g. the headlamp lens can be formed by a shaped polycarbonate article according to the invention.

Another preferred use of the composite according to the invention is the production of picture frames, wherein the polycarbonate sheet may also be provided with an anti-reflex coating.

The composite according to the invention is preferably also used for the production of glazing for motor vehicles.

Another preferred use is the production of displays in all types of housings of plastic, in particular displays for computers and mobile telephones. The matt screen of televisions can also be produced from the composite according to the invention.

The invention is explained below with the aid of FIGS. 1 to 3. These explanations are merely by way of example and therefore do not limit the invention.

FIG. 1 shows a coated polycarbonate film 11, 0.8 mm thick, which is provided with 16 bores 20 (only eight (8) of which are shown) in the edge region 23. A thermoplastic (for example) is injection-moulded around film 11 in the edge region 23 such that a plastic element 35, e.g., a frame is formed. During injection moulding around film 11, the thermoplastic material penetrates into bores 20, so that a structurally firm composite 16 is formed. The number and diameter of the bores depend on the forces which act between the film and the frame, i.e., the strength the composite is to have.

Figure 2:
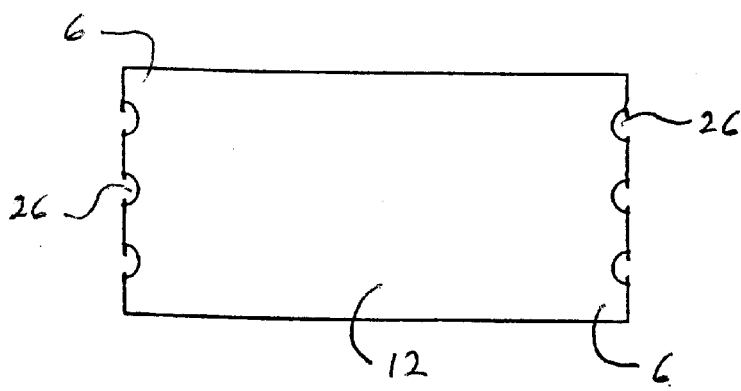
FIG. 2 is a representative depiction of a polycarbonate film 12 having recesses 26 in the edge region 6.

FIG. 2 shows a coated polycarbonate sheet 12, 5 mm thick, which has indentations 26 with under cuts in the edge region 6. The indentations were cast into sheet 12. The indentations 26 are filled with a thermoplastic material when such is injection-moulded around polycarbonate sheet 12, so that a structurally firm connection forms between the thermoplastic material and the sheet 12. This type of composite is particularly suitable for a glazing.

Figure 3:
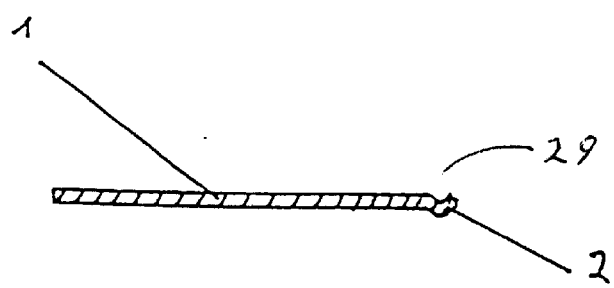
FIG. 3 is a representative sectional view of a polycarbonate film 1 having indentations or scallops in the edge region 29.

FIG. 3 shows a section through a polycarbonate film 1. The film 1 has indentations or scallops 2 in the edge region 29 which are incorporated into film 1 with a blunt tool. When a thermoplastic material is injection-moulded around film 1, this encloses the indentations or scallops 2, and thus produces a structurally firm composite.

Figure 4:
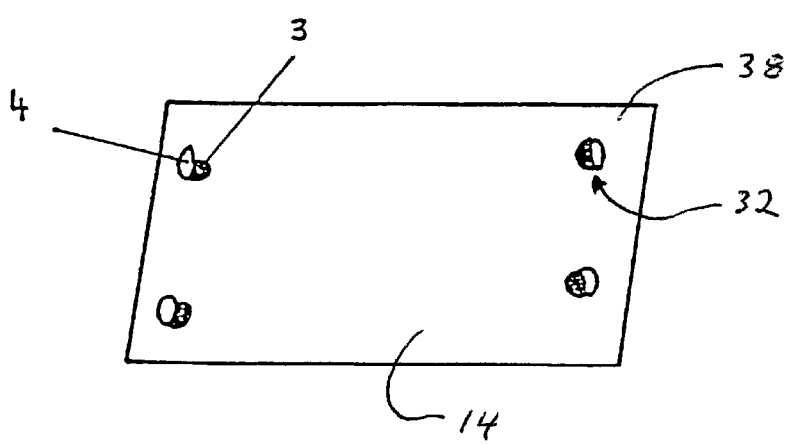
FIG. 4 is a representative depiction of a polycarbonate film 14 having half-stamps 32 in the edge region 38.

FIG. 4 shows a perspective view of a polycarbonate film 14 with half-stamps 32 in the edge region 38. A segment 3, e.g., circular, is partly stamped out of sheet 14 and is bent outwards during stamping. When a thermoplastic material is injection-moulded around sheet 14, this encloses the projecting, approximately circular disc 4 and thus produces a structurally firm composite.

In an embodiment of the present invention, composite structure 16 of FIG. 1 is a window, in which case polymer element 35 is a plastic frame or a seal. In another embodiment of the present invention, composite structure 16 of FIG. 1 may be a slide frame or a glazing for an automobile. In a further embodiment of the present invention, polycarbonate film 11, of composite structure 16 of FIG. 1, is a display in a plastic housing 35.

What is claimed is:

1. A composite structure comprising:
   (a) a shaped polycarbonate article having an edge region, said edge region having an adhesion-promoting geometric feature therein, said adhesion-promoting geometric feature being selected from the group consisting of bores, indentations, scallops, stamp-outs, half-stamps and corrugations;
   (b) a coating on the surface of said shaped polycarbonate article; and
   (c) a thermoplastic polymer that is one of injection-moulded and cast over the edge region of said shaped polycarbonate article, said thermoplastic polymer enveloping said adhesion-promoting geometric feature of said shaped polycarbonate article, the envelopment of said adhesion-promoting geometric feature by said thermoplastic polymer providing a structurally firm connection between said shaped polycarbonate article (a) and said thermoplastic polymer (c).

2. The composite structure of claim 1 wherein said shaped polycarbonate article (a) is selected from flat sheet, flat film, curved sheet and curved film.

3. The composite structure of claim 1 wherein said coating (b) is a scratch-resistant coating.

4. An article prepared from the composite structure of claim 1.

5. The composite structure of claim 1 wherein said composite structure is one of a picture frame and a slide frame.

6. The composite structure of claim 1 wherein said composite structure is a window having one of a seal and a frame.

7. The composite structure of claim 1 wherein said composite structure is a glazing for a motor vehicle.

8. The composite structure of claim 1 wherein said composite structure is a display in a plastics housing.

9. The composite structure of claim 1 wherein said adhesion-promoting geometric feature is selected from bores, and said polymer (c) envelopes and penetrates the bores.

10. The composite structure of claim 1 wherein said adhesion-promoting geometric feature is selected from indentations, and said polymer (c) envelopes and fills the indentations.

11. The composite structure of claim 1 wherein said edge region of said shaped polycarbonate article (a) comprises less than 20% of the total surface area of said shaped polycarbonate article (a).

12. The composite structure of claim 1 wherein said edge region of said shaped polycarbonate article (a) comprises less than 10% of the total surface area of said shaped polycarbonate article (a).

13. A process for producing a composite structure comprising:
   (a) providing a shaped polycarbonate article having an edge region, said edge region having an adhesion-promoting geometric feature therein, said adhesion-promoting geometric feature being selected from the group consisting of bores, indentations, scallops, stamp-outs, half-stamps and corrugations;
   (b) applying a coating over the surface of said shaped polycarbonate article; and
   (c) one of injection-moulding and casting a thermoplastic polymer over the edge region of said shaped polycarbonate article, said thermoplastic polymer enveloping said adhesion-promoting geometric feature of said shaped polycarbonate article, the envelopment of said adhesion-promoting geometric feature by said thermoplastic polymer providing a structurally firm connection between said shaped polycarbonate article (a) and said thermoplastic polymer (c).

\* \* \* \* \*